(12) United States Patent
Wesolowski

(10) Patent No.: US 7,373,107 B1
(45) Date of Patent: May 13, 2008

(54) ULTRA-WIDEBAND WIRELESS BACKPLANE

(75) Inventor: Jan S. Wesolowski, Redwood City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 533 days.

(21) Appl. No.: 10/318,585

(22) Filed: Dec. 13, 2002

Related U.S. Application Data

(60) Provisional application No. 60/370,994, filed on Apr. 8, 2002.

(51) Int. Cl.
*H04B 7/00* (2006.01)

(52) U.S. Cl. ............... 455/41.2; 361/785; 361/788

(58) Field of Classification Search ............ 455/552, 455/73, 422, 462, 553, 575, 41.1–41.3; 370/362, 370/364, 365, 366, 278, 329, 430; 375/220, 375/221, 222; 361/785, 788, 790
See application file for complete search history.

(56) References Cited

U.S. PATENT DOCUMENTS

| | | | |
|---|---|---|---|
| 4,641,317 | A | 2/1987 | Fullerton |
| 4,743,906 | A | 5/1988 | Fullerton |
| 5,677,927 | A | 10/1997 | Fullerton et al. |
| 5,687,169 | A | 11/1997 | Fullerton |
| 5,754,948 | A | 5/1998 | Metze |
| 6,351,652 | B1 * | 2/2002 | Finn et al. ................ 455/552.1 |
| 6,430,211 | B1 * | 8/2002 | Aiello ......................... 375/135 |
| 6,810,087 | B2 * | 10/2004 | Hoctor et al. ............... 375/259 |
| 6,859,506 | B1 * | 2/2005 | McCorkle .................... 375/346 |
| 6,912,372 | B2 * | 6/2005 | McCorkle et al. ............ 455/39 |
| 7,023,833 | B1 * | 4/2006 | Aiello et al. ................ 370/348 |
| 7,058,414 | B1 * | 6/2006 | Rofheart et al. ......... 455/456.4 |
| 2004/0213188 | A1 * | 10/2004 | Struhsaker et al. ......... 370/336 |

OTHER PUBLICATIONS

Foerster, Jeff,et al., "Ultra-Wideband Technology for Short-or Medium-Range Wireless Communications," Intel Technology Journal Q2, 2001, pp. 1-11.

Angelica, Amara D., "Powered by Pulse," http://www.techweek.com/articles/5-3-99/pulse.htm, 3 pages.

* cited by examiner

*Primary Examiner*—Edward F. Urban
*Assistant Examiner*—Raymond S. Dean
(74) *Attorney, Agent, or Firm*—Townsend and Townsend and Crew, LLP

(57) ABSTRACT

A backplane for an electronic data communication system is disclosed. The backplane comprises at least one ultra-wideband transmitter configured to transmit data in the form of a plurality of pulses in a wireless manner and at least one ultra-wideband receiver configured to receive the plurality of pulses and decode the plurality of pulses to retrieve the data. The data is to be transmitted wirelessly from a first module comprising the at least one ultra-wideband transmitter to a second module comprising the ultra-wideband receiver within the electronic communication system, the first and second modules residing in the system housing.

13 Claims, 2 Drawing Sheets

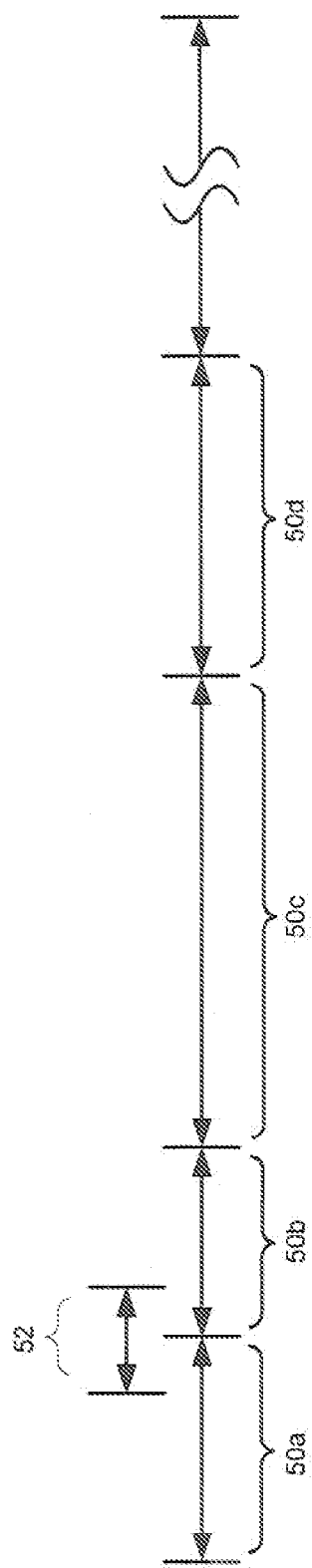

ULTRA-WIDEBAND WIRELESS BACKPLANE

CROSS-REFERENCES TO RELATED APPLICATIONS

The present application claims the benefit of priority under 35 U.S.C. § 119 from U.S. Provisional Patent Application Ser. No. 60/370,994, entitled "ULTRA-WIDE BAND WIRELESS BACKPLANE" filed on Apr. 8, 2002, the disclosure of which is hereby incorporated by reference in its entirety for all purposes.

BACKGROUND OF THE INVENTION

The present invention generally relates to backplanes of electronic systems, and more specifically, to a backplane that is capable of handling wireless data transfers.

Complex electronic systems, like data communication systems, typically comprise multiple functional modules that are required to pass large amounts of data amongst each other. Such systems usually employ a dedicated common interconnection element into which all the functional modules plug in. This interconnection element is sometimes called backplane or motherboard.

The backplane of an electronic system provides, among other functions, one or more data buses for passing data between the functional modules. These data buses may be parallel or serial, point-to-point, point-to-multi-point, or multipoint-to-multipoint. These data buses usually include a number of electrical signal transmission lines. During their design, great efforts are made to come as close as possible to perfect uniformity and stability of their transmission parameters and to avoid undesirable reflections of the signal energy from the hard-to-avoid points of discontinuity along the lines and at their ends.

The higher the required data transfer rate, the more difficult it is to achieve the signal integrity required to guarantee the robustness of the data transfer. The high performance interconnect components, like connectors and printed circuit boards are progressively more expensive. Yet, despite their high price, these components continue to have problems reaching the desirable data transfer bandwidth.

Efforts have been made to develop interconnect elements based on data transfer by means other than electrical signal transmission lines. These interconnect elements include, for example, backplanes employing optical signals carrying data through elements of fiber optics and millimeter-wave based wireless interconnection of electronic components. While these interconnect elements have been somewhat successful in achieving higher data rates, they require either very high-precision components, like the fiber optic elements, or highly complex components, like the millimeter-wave transceivers. These high-precision and highly complex components are very expensive thus keeping the cost of developing and manufacturing of interconnect elements quite high.

The millimeter-wave wireless interconnect solution is based on the traditional carrier signal modulation and required complex and, therefore, expensive heterodyne receivers. Furthermore, using discrete frequency carrier signals with relatively high spectral power density made the requirement of low electromagnetic interference caused by such systems hard to satisfy. As a result, such systems never became wide spread.

Hence, it would be desirable to provide a backplane for electronic systems that is capable of achieving high data transfer rates and yet is low cost.

BRIEF SUMMARY OF THE INVENTION

In an exemplary embodiment, a backplane for an electronic data communication system is disclosed. The data is intended to be transmitted through the backplane from one module to another module within the system. The backplane function is performed by a number of wireless buses, each including an ultra-wideband transmitter configured to encode and transmit data in the form of a train of pulses and at least one associated ultra-wideband receiver configured to receive the train of pulses and decode the train of pulses to retrieve the data.

Each wireless bus uses a train of pulses with specific characteristic(s). Such characteristics include, for example, the shape of each pulse and the pulse's coarse and fine time positions. In an exemplary embodiment, a pico-second pulse generator produces the train of pulses having the required shape. The time position of each pulse is coarsely modulated according to a unique pseudo-random sequence. In addition, the time position of each pulse is also modulated in fine increments based on the data to be transmitted.

In the receiver, the shape of each pulse is identified by a shape discriminating filter. The filter is allowed to recognize the pulses only during limited time intervals determined by a pseudo-random sequence generator of the receiver. The pseudo-random sequences used by the ultra-wideband transmitters and the ultra-wideband receivers within the same bus are identical and synchronized by a common sequence sync generator. Operating in this manner, the receivers can only receive and identify the train of pulses transmitted by the transmitter that they are associated with.

In an exemplary embodiment, the pseudo-random sequences used by all ultra-wideband transmitters and all ultra-wideband receivers within one system are synchronized by a common sequence sync generator.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 2 is an illustrative timing diagram showing a timing sequence used by a timing control circuit to control generation of pulses by a pico-second pulse generator in accordance with the present invention.

DETAILED DESCRIPTION OF THE INVENTION

Figure 1:
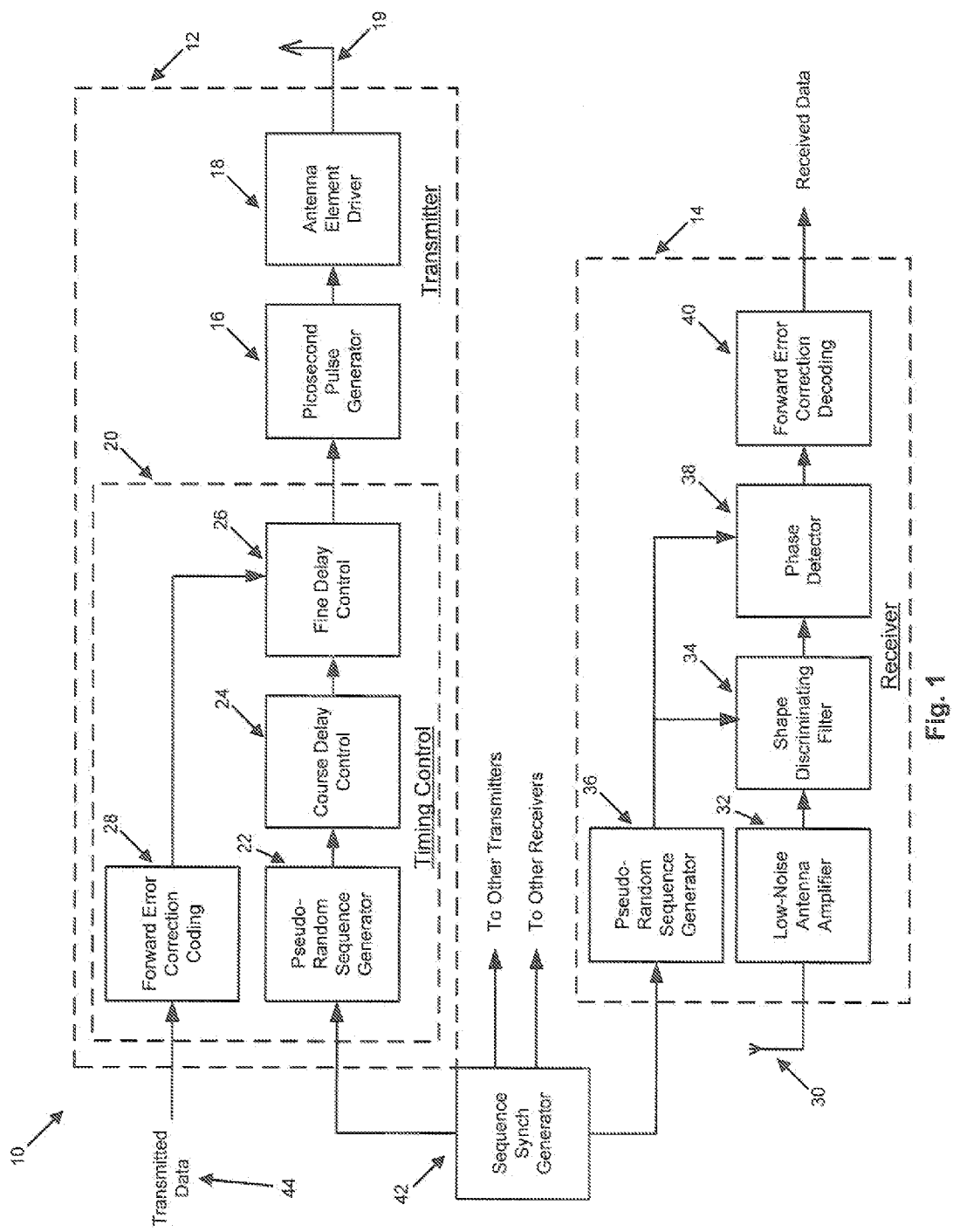
FIG. 1 is a simplified block diagram of an exemplary embodiment of the present invention.

The present invention in the form of one or more exemplary embodiments will now be described. The present invention utilizes time domain ultra-wideband (UWB) wireless data communication to achieve interconnect and data transfer functions in a backplane. Using UWB wireless data communication for the purpose of providing system interconnect function allows very high data transfer rates to be achieved in multiple channels without having to satisfy very stringent electrical, optical, and mechanical requirements and without using typically very expensive interconnect components of conventional electrical or optical backplanes. Furthermore, short propagation or transmission distances inside of the system housing make signal-to-noise requirements easy to satisfy and permit achieving very high data rates.

The time domain UWB wireless communication utilizing pseudo-random sequence of pulses to carry the data has an inherent spread-spectrum nature and very low spectral power density. Furthermore, using UWB wireless communication in a well controlled, enclosed environment of the system housing makes satisfying the requirement of low external interference easy.

Simplicity of its components and, hence, low cost, in comparison to the traditional millimeter-wave based wireless interconnect solutions, makes the time domain UWB wireless system interconnect solution feasible.

In one illustrative application, an exemplary embodiment of the present invention is used as an interconnect element to transfer data between different modules in a computer network switch, with the different modules residing in the same housing. This application includes several independent unidirectional point-to-point data transfers, as well as several point-to-multipoint data transfers. In this illustrative application, the interconnect element has independent and separate UWB transmitters and receivers. It should be understood that while the exemplary embodiment of the present invention is deployed in a computer network switch or router, a person of ordinary skill in the art will know of other ways and/or methods to deploy the present invention in other contexts and/or applications.

FIG. 1 is a simplified block diagram of an exemplary embodiment of a UWB wireless data bus 10 employed in a network switch (not shown) in accordance with the present invention. Referring to FIG. 1, the UWB wireless data bus 10 includes one transmitter 12, at least one corresponding receiver 14 and a sequence sync generator 42. The transmitter 10 further includes a timing control circuit 20, a pico-second pulse generator 16, an antenna element driver 18 and a transmitter antenna element 19, collectively coupled in a sequential configuration. The timing control circuit 20 uses bus data 44 and a control signal from the sequence sync generator 42 to provide and control timing of pulse generation by the pico-second pulse generator 16. Details of the timing control circuit 20 will be further described below. The pico-second pulse generator 16 generates a train of very short pulses based on input signals received from the timing control circuit 20. These pulses have certain characteristic(s) that are matched to the receiver 14, as further described below. The antenna element driver 18 applies the pulses to the transmitter antenna element 19 for transmission to the receiver 14. In one exemplary implementation, the transmitter antenna element 19 is part of a printed circuit board (not shown) within the network switch. In its simplest form, the transmitter antenna element 19 is a stub of printed circuit trace, about one inch long. In its more sophisticated form, the transmitter antenna element 19 can have a more complex shape chosen according to the antenna design rules in order to optimize signal power coupling from the antenna element driver 18 to the transmitter antenna element 19, and from the transmitter antenna element 19 to propagation space. The transmitted power level is chosen with consideration to the robustness of the transmission, as well as minimizing the interference between different buses inside and undesired radiation outside of the system.

As mentioned above, the generation and timing of each generated pico-second pulse is determined by the timing control circuit 20. In one exemplary embodiment, the timing control circuit 20 includes a first pseudo-random sequence generator 22, a forward error correction (FEC) encoder 28, a coarse delay control 24 and a fine delay control 26.

FIG. 2 is an illustrative timing diagram showing a timing sequence used by the timing control circuit 20 to control generation of pulses by the pico-second pulse generator 16. The first pseudo-random generator 22 is responsible for providing a pseudo-random sequence of timing intervals 50a-d. As will be further described below, the same pseudo-random sequence is shared between a transmitter/receiver(s) pairing. A pulse is to be generated between two adjacent timing intervals within the pseudo-random sequence. A window 52 within which the pulse is to be generated is controlled by the coarse delay control 24. The location within the window 52 where the pulse is to be generated is controlled by the fine delay control 26. More specifically, the fine delay control 26 is driven according to the bus data 44 to modulate the position of the to-be-generated pulse in small increments within the window 52. Optionally, before being applied to the fine delay control 26, the bus data 44 undergoes a forward error correction performed by the FEC encoder 28, which adds redundancy to the data for an additional improvement of transfer robustness. The exemplary embodiment of the present invention as described herein uses binary signals for controlling the fine delay. Ternary, or other multi-level forms of controlling signals may also be used, dependent on the constraints of a particular application. Hence, the timing control circuit 20 and the pico-second pulse generator 16 collectively generate pulses with specific characteristic(s) and in a specific pseudo-random timing sequence. The significance of the specific pulse characteristic(s) and pseudo-random timing sequence will be further described below.

The UWB electro-magnetic field radiated by the transmitter antenna element 19 reaches the receiver 14 and induces an electrical signal therein. In an exemplary embodiment, the receiver 14 includes a receiver antenna element 30, a second pseudo-random sequence generator 36, a low-noise antenna amplifier 32, a shape discriminating filter 34, a phase detector 38 and a forward error correction decoder 40.

The receiver antenna element 30 can, but does not have to, be similar to the transmitter antenna element 19. The receiver antenna element 30 is used to receive the signals transmitted by the transmitter antenna element 19 and is coupled to the input of a low-noise antenna amplifier 32. The signal from the low-noise antenna amplifier 32 then goes through the shape discriminating filter 34 designed to identify pulses with specific characteristic(s) and timing, such as, a particular shape and duration. These characteristic(s) correspond to those of pulses coming from the transmitter 12. Operation of the filter 34 is controlled by the second pseudo-random sequence generator 36, which synchronously generates exactly the same sequence as the one generated by the first pseudo-random sequence generator 22 in the transmitter 12 from which transmitted data is to be received. This control of the filter 34 allows it to pass only the pulses with specific characteristic(s) and in a specific pseudo-random timing sequence. In other words, only pulses from the transmitter 12 are identified and processed by the receiver 14. Other pulses with different characteristic(s) and in different pseudo-random timing sequences are ignored.

The filter 34 is designed in such a way as not to influence the fine modulation of the pulse timing which represents the bus data.

The modulating data is recovered in the next stage by the phase detector 38. The phase detector 38 performs precise phase comparison between the received pulses and the pulses of the unmodulated pseudo-random sequence generated by the second pseudo-random sequence generator 36. The output of the phase detector 38 is passed to the forward error correction (FEC) decoder 40 which uses redundancy added to the modulating signal to detect errors in the received data and to auto-correct some of the errors. The FEC decoder 40 then outputs the data that was originally sent from the transmitter 12.

Each wireless bus within the same system uses a transmitter that generates a distinct pseudo-random sequence. This distinct pseudo-random is recognized only by receiver(s) associated with that bus. In the exemplary embodiment described above, this is accomplished by the use of the first and second pseudo-random sequence generators 22 and 36 respectively in the transmitter 12 and the receiver 14. In order to simplify the synchronization of pseudo-random sequences in the transmitter 12 and the receiver 14 operating on the same bus, the transmitter 12 and the receiver 14 receive sequence synchronization pulses provided by a common sequence sync generator 42. The function of the common sequence sync generator 42 is to initiate the generation of the distinct pseudo-random sequence by the first and second pseudo-random sequence generators 22 and 36 at the same time. This ensures that, from a timing perspective, pulses transmitted by the transmitter 12 can be properly identified by the receiver 14 for processing. The sync pulses are generated at a relatively low rate like, for example, 19.44 MHz and are distributed to all sub-systems using an appropriate number of drivers at the source and point-to-point electrical transmission lines through the backplane.

In the exemplary embodiment described above, the transmitter 12 has a corresponding receiver 14. In an alternative exemplary embodiment, the transmitter 12 can have a number of corresponding receivers, each similar to the receiver 14 described above. In another alternative exemplary embodiment, a backplane can include a number of transmitters, each similar to the transmitter 12 described above and each having one or more corresponding receivers. In one exemplary embodiment, it is convenient to synchronize transmitters and receivers on buses to the same common sequence sync generator.

Based on the disclosure and teachings provided herein, a person of ordinary skill in the art will know of ways and/or methods to implement the various components of the present invention with appropriate software and/or hardware circuit design.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A backplane for an electronic communication system, the backplane residing in a system housing, comprising:

at least one ultra-wideband transmitter configured to transmit data in the form of a plurality of pulses in a wireless manner;

at least one ultra-wideband receiver configured to receive the plurality of pulses and decode the plurality of pulses to retrieve the data; and a sequence sync generator configured to synchronize the ultra-wideband transmitter and the ultra-wideband receiver;

wherein the data is to be transmitted wirelessly from a first module comprising the at least one ultra-wideband transmitter to a second module comprising the at least one ultra-wideband receiver within the electronic communication system, the first and second modules residing in the system housing;

wherein the sequence sync generator provides a synchronization signal to both the ultra-wideband transmitter and the ultra-wideband receiver via a point-to-point electrical connection through the backplane, thereby allowing the plurality of pulses transmitted by the ultra-wideband transmitter to be received and identified by the ultra-wideband receiver.

2. The backplane of claim 1 wherein the ultra-wideband transmitter further comprises:

a timing control circuit configured to generate a pseudo-random sequence; and a pulse generator configured to generate the plurality of pulses according to the pseudo-random sequence, the plurality of pulses sharing at least one characteristic; and wherein the ultra-wideband receiver further comprises:

a pseudo-random sequence generator configured to generate the pseudo-random sequence; and a filter configured to identify the plurality of pulses using the at least one characteristic and the pseudo-random sequence generated by the pseudo-random sequence generator.

3. A network switch or router incorporating the backplane as recited in claim 1.

4. A backplane for an electronic communication system, the backplane coupled to a first module and a second module and residing in a system housing, the backplane comprising:

a transmitter configured to transmit a plurality of pulses using ultra-wideband technology, the transmitter comprising:

a first pseudo-random sequence generator configured to generate a pseudo-random sequence;

a pulse generator configured to generate the plurality of pulses according to the pseudo-random sequence, the plurality of pulses sharing at least one characteristic and representing data to be transmitted from the first module to the second module, wherein the first and second module reside in the system housing; and a transmitting circuit configured to transmit the plurality of pulses; and a plurality of receivers each configured to receive and identify the plurality of pulses using ultra-wideband technology, each receiver comprising:

a second pseudo-random sequence generator configured to generate the pseudo-random sequence; and a filter configured to identify the plurality of pulses using the at least one characteristic and the pseudo-random sequence generated by the second pseudo-random sequence generator; and a sequence sync generator configured synchronize the transmitter and the plurality of receivers;

wherein the sequence sync generator provides a synchronization signal to both the transmitter and the plurality of receivers, thereby allowing the plurality of pulses transmitted by the transmitter to be received and identified by the plurality of receivers;

wherein the sequence sync generator provides a synchronization signal to both the transmitter and the plurality of receivers via a point-to-point electrical connection through the backplane.

5. A network switch or router incorporating the backplane as recited in claim 4.

6. A backplane for an electronic communication system having a first and a second module, the first and second modules residing in the same housing, the backplane comprising:

a plurality of transmitters, each transmitter configured to transmit data in the form of a plurality of pulses using ultra-wideband technology and the plurality of pulses uniquely corresponding to that transmitter; and a plurality of receivers, each receiver being associated with one of the plurality of transmitters and configured to receive the corresponding plurality of pulses from the associated transmitter and decode the corresponding plurality of pulses to retrieve the corresponding data;

a sequence sync generator configured to synchronize each of the plurality of transmitters with its associated one or more receivers; and wherein each of the plurality of transmitter is associated with one or more of the plurality of receivers;

wherein the first module wirelessly transmits data to the second module using one of the plurality of transmitters and its associated one or more receiver(s), wherein the first and second module reside in the same housing; and wherein the sequence sync generator provides a synchronization signal to both the transmitter and its associated one or more receivers via a point-to-point electrical connection through the backplane.

7. The backplane of claim 6 wherein each transmitter further comprises:

a timing control circuit configured to generate a pseudo-random sequence, the pseudo-random sequence being uniquely associated with that transmitter; and a pulse generator configured to generate the plurality of pulses according to the pseudo-random sequence, the plurality of pulses sharing at least one characteristic, the at least one characteristic being unique to the plurality of pulses generated by that pulse generator; and wherein each receiver further comprises:

a pseudo-random sequence generator configured to generate the pseudo-random sequence uniquely associated with a corresponding transmitter; and a filter configured to identify the plurality of pulses from the corresponding transmitter using the at least one characteristic and the pseudo-random sequence that are both uniquely associated with the corresponding transmitter.

8. A network switch or router incorporating the backplane as recited in claim 6.

9. A method for transmitting data in a backplane of an electronic communication system, the backplane residing within a housing, comprising:

encoding data to be transmitted into a plurality of pulses;

generating the plurality of pulses based on a unique pseudo-random sequence, the plurality of the pulses sharing at least one characteristic;

transmitting the plurality of pulses via a transmitter;

receiving the plurality of pulses via one or more receivers;

synchronizing the one or more receivers to the transmitter, wherein synchronizing the one or more receivers to the transmitter includes providing a synchronization signal to both the transmitter and the one or more receivers via a point-to-point electrical connection through the backplane;

identifying the received plurality of pulses using the at least one characteristic and the unique pseudo-random sequence; and decoding the data from the identified plurality of pulses;

wherein the method is implemented using ultra-wideband technology; and wherein the data is wirelessly transmitted between a first module and a second module residing in the housing.

10. A network switch or router utilizing the method as recited in claim 9.

11. A method for transmitting data in a backplane of an electronic communication system, the backplane residing within a housing, comprising:

directing a timing control circuit to generate a unique pseudo-random sequence;

directing a pulse generator to generate a plurality of pulses based on the unique pseudo-random sequence, the plurality of pulses sharing at least one characteristic and representing data to be transmitted;

transmitting the plurality of pulses via a transmitter;

receiving the plurality of pulses via one or more receivers;

directing a pseudo-random sequence generator to generate the unique pseudo-random sequence;

synchronizing the one or more receivers to the transmitter, wherein synchronizing the plurality of the one or more receivers includes providing a synchronization signal to both the transmitter and the one or more receivers via a point-to-point electrical connection through the backplane;

directing a filter to identify the received plurality of pulses using the unique pseudo-random sequence generated by the pseudo-random sequence generator and the at least one characteristic; and decoding the identified plurality of pulses to retrieve the data;

wherein the method is implemented using ultra-wideband technology; and wherein the data is wirelessly transmitted between a first module and a second module, the first and second modules residing in the same housing as the backplane.

12. The method of claim 11 further comprising:

synchronizing the respective generation of the unique pseudo-random sequence by the timing control circuit and the pseudo-random sequence generator.

13. A network switch or router utilizing the method as recited in claim 11.

* * * * *